United States Patent Office 2,997,465
Patented Aug. 22, 1961

2,997,465
PRODUCTION OF WATER-SOLUBLE COPOLYMERS
Hans-Joachim Krause and Franz Drexler, Ludwigshafen (Rhine), Germany, assignors to Badische Anilin- & Soda-Fabrik Aktiengesellschaft, Ludwigshafen (Rhine), Germany
No Drawing. Filed July 2, 1957, Ser. No. 669,446
Claims priority, application Germany July 7, 1956
8 Claims. (Cl. 260—80.5)

This invention relates to the production of water-soluble copolymers and to a specific process of manufacturing such copolymers.

Water-soluble polymers and copolymers of acrylic acid are known and are used in industry either in the form of free macromolecular acids or their water-soluble salts as thickening agents, protective colloids and the like. For many fields of use, however it is a disadvantage that these hydrophilic polymerization products have only a slight affinity for numerous organic substances, especially those which are hydrophobic.

The object of this invention is therefore to provide new copolymers and a specific process for the production of copolymers of acrylic acid which, while being water-soluble, nevertheless have a high affinity for organic compounds.

We have found that such copolymers are obtained by copolymerizing in aqueous solution a major amount of acrylic acid with acrylonitrile and an acrylic acid ester of a short-chain, saturated, aliphatic monoalcohol. In addition to the three said monomeric compounds, there may also be used acrylamide and/or methacrylamide for the production of the copolymers.

Suitable short-chain, aliphatic monoalcohols are especially the 1 to 4 carbon atom alkanols, methanol and ethanol, and also propanol, isopropanol and the various butanols. Although the concentration of the monomers can be varied within wide limits, it is advantageous in the production of the triple polymers to use a monomer mixture which contains 50 to 90% of acrylic acid, 2.5 to 25% of acrylonitrile and 2.5 to 15% of an acrylic acid ester. Suitable monomer mixtures for the production of quadruple or quintuple polymers preferably consists of 50 to 86% of acrylic acid, 2 to 10% of acrylonitrile, 2 to 10% of an acrylic acid ester and 2 to 30% of acrylamide and/or methacrylamide. Mixtures of 65 to 75% of acrylic acid, 3 to 7% of acrylonitrile, 3 to 7% of an acrylic acid ester and 10 to 25% of acrylamide and/or methacrylamide are of special interest.

The copolymerization is carried out in aqueous solution, preferably at temperatures between 15° and 50° C. Water-soluble per-compounds, such as persulfates or hydrogen peroxide, have proved suitable as polymerization initiators, and reducing compounds, such as formaldehyde-sulfoxylate or sodium thiosulfate, have proved suitable as polymerization activators. Hydroxylamine is a good regulator in this polymerization process. The total concentration of the monomers in the reaction medium should preferably lie between 5 and 40%, advantageously between 10 and 30%, with reference to the total weight of the reaction mixture.

The copolymers can be used, without previous neutralization or after neutralization with bases, for example ammonia, as thickening agents, adhesives, binding agents, finishing agents and sizing agents. They are especially suitable as sedimentation assistants for the clarification of slimes, such as are present in mining, or of industrial waste liquors.

The following examples will further illustrate this invention but the invention is not restricted to these examples. The parts specified in the examples are parts by weight.

Example 1

570 parts of water, 70 parts of acrylic acid, 20 parts of acrylamide, 5 parts of acrylonitrile and 5 parts of ethyl acrylate are mixed at room temperature in a stirring vessel; 0.038 part of hydroxylamine is added and the whole allowed to stand after the uniform introduction of 0.4 part of potassium persulfate and 0.04 part of formaldehyde sulfoxylate. After about 12 hours, the whole is vigorously and thoroughly mixed and, after about a further 4 hours, adjusted to pH 8.5 by the addition of 90 parts of concentrated ammonia.

Example 2

A 25% aqueous solution is prepared from 70 parts of acrylic acid, 20 parts of acrylamide, 5 parts of acrylonitrile and 5 parts of methylacrylate; the solution is mixed with 0.045 part of hydroxylamine and 0.15 part of potassium persulfate and then 0.015 part of formaldehyde sulfoxylate added at 50° C. The system is allowed to stand, and, after 12 hours, brought to the desired pH value with concentrated ammonia while stirring vigorously. By adding 90 parts of concentrated ammonia, a pH value of about 8.5 is reached. The K-value of the 1% aqueous solution amounts to about 35.

Example 3

A 25% aqueous solution is prepared from 70 parts of acrylic acid, 20 parts of acrylamide, 5 parts of acrylonitrile and 5 parts of methyl acrylate, then 0.06 part of hydroxylamine, 0.3 part of potassium persulfate and, at 35° C., 0.015 part of formaldehyde sulfoxylate are added and the further procedure of Example 1 followed. The copolymer obtained has a K-value of about 76.

Example 4

A 30% aqueous solution is prepared from the same mixture of monomers as in Example 3, then 0.06 part of hydroxylamine, 0.45 part of potassium persulfate and, at 40° C., 0.045 part of formaldehyde sulfoxylate are added and the whole treated as described in Example 1. A copolymer of the K-value about 95 is obtained.

Example 5

0.1 part of hydroxylamine, 0.3 part of potassium persulfate and, at 40° C., 0.06 part of formaldehyde sulfoxylate are added to 70 parts of acrylic acid, 20 parts of acrylamide, 5 parts of acrylonitrile and 5 parts of ethyl acrylate in 30% aqueous solution, and treated as in Example 1. The K-value amounts to about 100.

Example 6

0.06 part of hydroxylamine, 0.3 part of potassium persulfate and, at 25° C., 0.03 part of formaldehyde sulfoxylate are added to the same monomer mixture in 30% aqueous solution as in Example 2 and polymerized. The copolymer has a K-value of about 120.

Example 7

0.03 part of hydroxylamine, 0.3 part of potassium persulfate and, at 20° C., 0.06 part of formaldehyde sulfoxylate are added to the same polymer mixture as in Example 5 in 15% aqueous solution and polymerized. The K-value of the copolymer is about 135.

Example 8

0.1 part of hydroxylamine, 0.3 part of potassium persulfate and, at 30° C., 0.06 part of formaldehyde sulfoxylate are added to the same monomer mixture as in Example 5 in 15% aqueous solution, and polymerized. The K-value of the copolymer is 160.

Example 9

0.03 part of hydroxylamine, 0.3 part of potassium persulfate and, at 18°, 0.03 part of formaldehyde sulfoxylate are added to a 15% aqueous solution of 60 parts of acrylic acid, 35 parts of acrylamide, 2.5 parts of acrylonitrile and 2.5 parts of ethyl acrylate, and polymerized. A polymer of the K-value about 195 is formed.

Example 10

0.03 part of hydroxylamine, 0.3 part of potassium persulfate and, at 20° C., 0.03 part of formaldehyde sulfoxylate are added to a 15% aqueous solution of 90 parts of acrylic acid, 5 parts of acrylamide, 2.5 parts of acrylonitrile and 2.5 parts of ethyl acrylate and polymerized. The K-value of the copolymer formed is 140.

Example 11

A 15% aqueous solution of 50 parts of acrylic acid, 25 parts of acrylonitrile, 15 parts of methacrylamide and 10 parts of methyl acrylate is adjusted to pH 8 with concentrated ammonia while cooling and then 0.3 part of potassium persulfate and, at 20° C., 0.1 part of formaldehyde sulfoxylate are added while stirring. When the polymerization has ended, the K-value of the copolymer is 60.

Example 12

A 15% aqueous solution of 50 parts of acrylic acid, 25 parts of acrylonitrile, 15 parts of acrylamide and 10 parts of methyl acrylate is polymerized as in Example 1 with 0.3 part of potassium persulfate and 0.1 part of formaldehyde sulfoxylate at pH 8. The K-value of the copolymer is 90.

Example 13

A 15% aqueous solution of 60 parts of acrylic acid, 25 parts of acrylonitrile, 10 parts of acrylamide and 5 parts of methyl acrylate is adjusted to pH 5.5 with concentrated ammonia and then at 20° C., 0.3 part of potassium persulfate and 0.1 part of formaldehyde sulfoxylate are added. After 12 hours, the desired pH-value is set up with ammonia. The K-value of the copolymer is 100.

Example 14

0.6 part of potassium persulfate and 0.1 part of formaldehyde sulfoxylate are added at 25° C. to a 15% aqueous solution of 70 parts of acrylic acid, 10 parts of acrylonitrile, 10 parts of acrylamide and 10 parts of formaldehyde sulfoxylate and allowed to stand. After 12 hours it is neutralized with concentrated ammonia. The K-value of the copolymer is 160.

Example 15

0.6 part of potassium persulfate and 0.1 part of formaldehyde sulfoxylate are added at 25° C. to a 15% aqueous solution of 70 parts of acrylic acid, 15 parts of acrylamide, 10 parts of methyl acrylate and 5 parts of acrylonitrile and further treated as in Example 14. The K-value of the copolymer is 195.

Example 16

0.3 part of potassium persulfate and 0.1 part of formaldehyde sulfoxylate are added to a 15% aqueous solution of 50 parts of acrylic acid, 25 parts of acrylonitrile, 15 parts of acrylamide and 10 parts of methyl acrylate at 20° C. After standing for 12 hours, it is adjusted to pH 8 with concentrated ammonia. The K-value of the copolymer is 235.

Example 17

0.015 part of hydroxylamine, 0.3 part of potassium persulfate and, at 20° C., 0.03 part of formaldehyde sulfoxylate are added to a 15% aqueous solution of 80 parts of acrylic acid, 10 parts of acrylonitrile and 10 parts of ethyl acrylate and polymerized. The K-value of the copolymer is 110.

Example 18

0.015 part of hydroxylamine, 0.3 part of potassium persulfate and, at 35° C., 0.03 part of formaldehyde sulfoxylate are added to a 15% aqueous solution of 80 parts of acrylic acid, 5 parts of acrylonitrile and 15 parts of acrylic acid methyl ester and polymerized. The K-value of the copolymer is 100.

Example 19

0.06 part of hydroxylamine, 0.5 part of potassium persulfate and, at 25° C., 0.08 part of formaldehyde sulfoxylate are added to a 25% aqueous solution of 86.5 parts of acrylic acid, 6.75 parts of acrylonitrile and 6.75 parts of ethyl acrylate. After polymerization and neutralization with ammonia a product of the K-value about 140 is obtained.

We claim:

1. A water-soluble copolymer of monomers consisting essentially of from 50 to 90% of acrylic acid, 2 to 25% of acrylonitrile, 2 to 15% of an acrylic acid ester of a 1 to 4 carbon atom alkanol and 0 to 30% of at least one amide selected from the group consisting of acrylamide and methacrylamide.

2. A water-soluble copolymer of monomers consisting essentially of 50 to 90% of acrylic acid, 2.5 to 25% of acrylonitrile and 2.5 to 15% of an acrylic acid ester of a 1 to 4 carbon atom alkanol.

3. A water-soluble copolymer of monomers consisting essentially of from 50 to 86% of acrylic acid, 2 to 10% of acrylonitrile, 2 to 10% of an acrylic acid ester of a 1 to 4 carbon atom alkanol and 2 to 30% of at least one amide selected from the group consisting of acrylamide and methacrylamide.

4. A water-soluble copolymer of monomers consisting essentially of from 65 to 75% acrylic acid, 3 to 7% of acrylonitrile, 3 to 7% of an acrylic acid ester of a 1 to 4 carbon atom alkanol, and 10 to 25% of at least one amide selected from the group consisting of acrylamide and methacrylamide.

5. A process for the production of a water-soluble copolymer which comprises copolymerizing monomers consisting essentially of 50 to 90% of acrylic acid, 2 to 25% of acrylonitrile, 2 to 15% of an acrylic acid ester of a 1 to 4 carbon atom alkanol, and 0 to 30% of at least one amide selected from the group consisting of acrylamide and methacrylamide in aqueous solution at a temperature in the range of 15° to 80° C.

6. A process for the production of a water-soluble copolymer which comprises copolymerizing monomers consisting essentially of 50 to 90% of acrylic acid, 2.5 to 25% of acrylonitrile, and 2.5 to 15% of an acrylic acid ester of a 1 to 4 carbon atom alkanol in aqueous solution at a temperature in the range of 15° to 80° C.

7. A process for the production of a water-soluble copolymer which comprises copolymerizing monomers consisting essentially of 50 to 86% of acrylic acid, 2 to 10% of acrylonitrile, 2 to 10% of an acrylic acid ester of a 1 to 4 carbon atom alkanol, and 2 to 30% of at least one amide selected from the group consisting of acrylamide and methacrylamide in aqueous solution at a temperature in the range of 15° to 80° C.

8. A process for the production of a water-soluble copolymer which comprises copolymerizing monomers consisting essentially of 65 to 75% of acrylic acid, 3 to 7% of acrylonitrile, 3 to 7% of an acrylic acid ester of a 1 to 4 carbon atom alkanol in aqueous solution at a temperature in the range of 15° to 80° C.

References Cited in the file of this patent

UNITED STATES PATENTS

| | | |
|---|---|---|
| 2,123,599 | Fikentscher et al. | July 12, 1938 |
| 2,476,527 | Barnes et al. | July 19, 1949 |
| 2,726,230 | Carlson | Dec. 6, 1955 |
| 2,772,166 | Fowler | Nov. 27, 1956 |
| 2,811,494 | Smith et al. | Oct. 29, 1957 |